(12) United States Patent
Yamada et al.

(10) Patent No.: US 6,979,146 B2
(45) Date of Patent: Dec. 27, 2005

(54) ROAD SURFACE SENSOR AND MONITORING CONTROL METHOD FOR ROAD SURFACE

(75) Inventors: Tadayuki Yamada, Fukui (JP); Kouji Yamamoto, Tokyo (JP); Makoto Goto, Fukushima (JP)

(73) Assignees: Yamada Technic Corporation, Fukui-ken (JP); Japan Highway Public Corporation, Tokyo (JP)

( * ) Notice: Subject to any disclaimer, the term of this patent is extended or adjusted under 35 U.S.C. 154(b) by 5 days.

(21) Appl. No.: 10/923,800

(22) Filed: Aug. 24, 2004

(65) Prior Publication Data

US 2005/0047864 A1    Mar. 3, 2005

(30) Foreign Application Priority Data

Aug. 25, 2003   (JP) ............................ 2003-208615

(51) Int. Cl.⁷ ............................................ E01C 23/14
(52) U.S. Cl. .............................. 404/71; 404/77; 404/79
(58) Field of Search ............................. 404/71, 77, 79

(56) References Cited

U.S. PATENT DOCUMENTS

| | | | |
|---|---|---|---|
| 5,062,736 A * | 11/1991 | Katsuragi et al. ............ | 404/72 |
| 5,568,385 A * | 10/1996 | Shelton ......................... | 702/3 |
| 5,762,447 A | 6/1998 | Hachiki et al. ............... | 404/77 |
| 5,982,288 A * | 11/1999 | Sawatari et al. ............ | 340/601 |
| 6,330,519 B1 * | 12/2001 | Sawatari ...................... | 702/127 |
| 6,592,288 B2 * | 7/2003 | Chun .......................... | 404/71 |
| 6,749,364 B1 * | 6/2004 | Baker et al. ............... | 404/84.5 |
| 6,825,444 B1 * | 11/2004 | Tuan et al. ................. | 219/213 |
| 2003/0191577 A1 * | 10/2003 | Decaus ....................... | 701/117 |

* cited by examiner

*Primary Examiner*—Thomas B. Will
*Assistant Examiner*—Raymond W Addie
(74) *Attorney, Agent, or Firm*—Wenderoth, Lind & Ponack, L.L.P.

(57) ABSTRACT

In order to melt snow and prevent freezing without consuming energy wastefully and to monitor a road surface state remotely, a road surface sensor includes: a rotating stand provided so as to be reciprocatingly rotatable upward on the road surface; a snow-melting/freezing heat quantity measurement dummy road surface having an electric heater buried therein and to use as a reference road surface for heat quantity measurement to derive a melting heat quantity for snow falling on the surface and a heat quantity required for freezing prevention; a reference light irradiating/reflected light receiving device that is attached so as to be rotatable with the rotating stand; a space reflected light receiving device; a non-contact road temperature measuring device; a non-contact snow cover depth measuring device; a road surface image pickup device; and a moisture sensor. The reference light irradiating/reflected light receiving device includes a reference light irradiating device for irradiating reference light and a reflected light receiving device for receiving reflected light of the reference light from the road surface, and the reflected light receiving device separates and receives only reflected light of the reference light out of the reflected light from the road surface.

3 Claims, 4 Drawing Sheets

ROAD SURFACE SENSOR AND MONITORING CONTROL METHOD FOR ROAD SURFACE

BACKGROUND OF THE INVENTION

1. Field of the Invention

The present invention relates to a road surface sensor that can confirm a state of weather/road surface/control in a remote location while performing automatic control for road snow-melting by measuring a snowfall and an amount of freezing as a heat quantity required for snow-melting and a heat quantity required for freezing prevention in a unit time period, measuring a state of distribution of drying, wetting, snow cover, snow cover depth, and temperature on a road surface transversely in a non-contact manner, and combining the measured heat quantities and the state of road surface, and a method for control for snow-melting and remote monitoring control using the road surface sensor.

2. Related Art

There are various types of snow-melting facilities, which are indispensable for life and industrial activities in snow-covered cold regions. In particular, whereas the snow-melting facilities contribute to local economic activities significantly, the snow-melting facilities consume enormous thermal energy. When a situation coping with snowfall and freezing is examined in detail, heat is often supplied wastefully in a control method using a sensor under the present situation. In addition, since a road surface is covered with snow when snowfall exceeding a snow-melting capacity continues, there is a demand for a sensor for snow-melting control having a complex function that can remotely monitor a change in weather and a snow-melting state while performing control for reducing a heat quantity for snow-melting to the utmost limit and can also perform control from a remote location according to the state.

In snow-melting by road heating generally performed, a road surface is heated using electric heat, a heat pump, oil burning heat, or the like as a heat source. Reduction of carbon dioxide generated from the heat source is a global-scale problem, and reduction of economical burdens proportional to a consumed heat quantity is a problem as well.

In most of snow-melting facilities for roads, a heat supply section and a temperature sensing section are buried about 10 cm below a road surface, and a part about 10 cm below the road surface is warmed to about 7° C. to prevent snow cover and freezing. In any case, control is centered on increasing temperature on the road surface and is not performed based on a feedback of a result of snow/melting and a result of freezing prevention on the road surface. Thus, under the present situation, heat has to be supplied more than required, attaching importance on safety.

In addition, the snow-melting facilities are often designed based on a snowfall per day for thirty years in the past of observation in local meteorological observatories. In general, the snow-melting facilities are designed based on a snowfall depth per day occurring in object regions so as to cope with 80% of frequency of the occurrence. Most of the snow-melting facilities are designed on condition that the snow-melting facilities cannot cope with the remaining 20%.

The snow-melting capacity set according to such design conditions, though it varies for each region, is about 48 cm as a snowfall per day, which is equivalent to about 2 cm as a snowfall per hour. When a snow-melting heat quantity for coping with the snowfall is converted into electric power, a range of 150 W to 250 W per 1 $m^2$ is a design value.

In the design conditions, as an exposure ratio of a road surface, about 70 to 80% is believed to be sufficient. In other words, snow cover may remain in an area of 20 to 30% of a snow-melting surface. As opposed to the capacity of the snow-melting facilities coping with about 2 cm of snowfall per hour designed under such conditions, actual snowfall may be heavier and weaker. In a result obtained by converting heat quantity values required for snow-melting for every 5 to 10 minutes, which have been measured for several years in twenty-three locations in the country, into a snow cover depth per hour, snowfall exceeding 2 cm occurs frequently, snowfall equal to or more than 5 cm occurs often, and time during which a snow cover depth per hour is less than 2 cm is more than half of a total time during which snowfall phenomena occurred.

In this way, different results are obtained in the case in which a snowfall is observed by a unit of day and the case in which a snowfall is observed for a short time. Thus, in the conventional control, since snowfall changing in this way is controlled with 100% of the capacity of the snow-melting facilities, waste of a heat quantity occurs. Moreover, the conventional control method is described in detail as follows.

Three sensing elements including an air temperature sensor, a moisture sensor buried below a road surface, and a temperature sensor buried in the road about 10 cm below the road surface (hereinafter referred to as three element control are used as sensors. In the case in which air temperature is 2° C. or less and moisture is sensed, heat supply is started to keep temperature in the road about 10 cm below the road surface at about 8° C. so that snow melting is carried out. If moisture is not sensed, heat supply for keeping the temperature in the road at about 4° C. is continued in order to prevent freezing.

This is because, as described above, since most of the snow-melting facilities are designed to cope with about 2 cm in a snowfall depth per hour in general and a thermal conductivity of a road surface material is relatively small, snow cover of the design value of 2 cm/h cannot be melted unless temperature is risen to about 8° C. in the temperature sensor section in the case in which the heat supply section is at the depth of about 10 cm. However, since snowfall changes from time to time, when weak snowfall continues, temperature on the road surface rises more than necessary, and the heat is often lost as heat of evaporation of melted water. This results in wasteful supply of heat.

In addition, when heavy snowfall exceeding the snow-melting capacity continues, snow covers the road surface even if heat is supplied at full capacity. Then, since the control for freezing prevention also sets the temperature sensor section to about 8° C., the heat is lost as heat of evaporation when the road surface is wet, and the heat is lost in radiation and in the air to cause heat loss when the road surface is dry.

The moisture sensor is provided in order to reduce such wasteful heat. However, since the moisture sensor is installed in a place where water tends to gather attaching importance on safety of an entire snow-melting surface, moisture in a moisture electrode section of the moisture sensor is gone at a point when the entire snow-melting surface has almost dries. Thus, there is a disadvantage that, considering the entire snow-melting surface, surface temperature on the road surface rises more than necessary, and there is a waste of a heat quantity that is lost as heat of evaporation and radiant heat of moisture.

Moreover, in the case in which preheating operation is performed based on air temperature because time is required from start of heat supply until temperature rising on the snow-melting surface, surface temperature rises more than necessary and heat is supplied wastefully in many hours. In addition, 70 to 80% is believed to be sufficient as a road surface exposure ratio in the design conditions. However, in the control according to combination of snowfall sensors, moisture sensors buried at various points and a temperature sensor, because a state of a snow-melting road surface cannot be sensed so that a state of snow cover distribution cannot be determined, and temperature in the road is kept at about 8° C. unconditionally. As a result, the road surface temperature rises more than necessary and snow on the road surface is completely melted, and thus heat is supplied more than necessary.

Moreover, it is necessary to secure safe driving of vehicles in the road snow melting. Since it is necessary to remove snow on a road surface when snowfall exceeding the capacity of the snow-melting facilities continues for a long time, information on a state of snow melting on the road surface is required. However, the conventional snow-melting control sensor does not have a function of measuring a road surface state and cannot provide information on the road surface state.

SUMMARY OF THE INVENTION

The conventional snow-melting apparatus has problems as described above. The invention intends to solve these problems and it is an object of the invention to provide a road surface sensor that can measure a road surface state sequentially, perform snow-melting and prevent freezing without consuming energy wastefully, and remotely monitor the road surface state without performing patrol, and a monitoring control method for a road surface using the road surface sensor.

In order to reduce enormous energy inputting to road surface snow-melting on a road, to the utmost limit, a road surface sensor according to the invention is a road surface sensor for performing automatic control for road snow-melting by measuring a snowfall and an amount of freezing as a heat quantity required for snow-melting and a heat quantity required for freezing prevention, measuring a state of distribution of drying, wetting, snow cover, snow cover depth, and temperature on a road surface transversely in a non-contact manner, and combining the measured heat quantities and a state of road surface, the road surface sensor including: a rotating stand that is provided so as to be reciprocatingly rotatable upward on the road surface; a snow-melting/freezing heat quantity measurement dummy road surface having an electric heater buried therein and being used as a reference road surface for heat quantity measurement to derive a melting heat quantity for snow falling on the surface and a heat quantity required for freezing prevention; a reference light irradiating/reflected light receiving device attached so as to be rotatable with the rotating stand; a space reflected light receiving device; a non-contact road temperature measuring device; a non-contact snow cover depth measuring device; a road surface image pickup device; and a moisture sensor, wherein the reference light irradiating/reflected light receiving device includes a reference light irradiating device for irradiating reference light and a reflected light receiving device for receiving reflected light of the reference light from the road surface, and the reflected light receiving device separates and receives only reflected light of the reference light out of the reflected light from the road surface.

The reference light irradiating device may include four sets of irradiation sources, each set having a condensing type high-intensity light-emitting diode combined with a condensing lens to irradiate reference light on the road surface to which high-frequency modulation is applied. The reflected light receiving device may be a device using a condensing type phototransistor which is sensitive to the same wavelength as a red wavelength of the reference irradiated light, and a lens for condensing reflected light on the light receiving device.

In addition, a monitoring control method for a road surface according to the invention includes the above mentioned road surface sensor and a signal converter to change various measurement values measured by the road surface sensor into signals, performs snow-melting control by combining respective measurement results, transmits a road surface image for confirming the information on the measurement results and a snow-melting state as images, and receives an operation stop signal from an information receiving side.

An amount of energy consumed in snow-melting can be reduced when snowfall is less than a snow-melting capacity and when a heat loss caused at the time of a preheating operation and a freezing preventing operation is controlled. Thus, the road surface sensor of the invention measures a change in the weather as a heat quantity required for snow-melting and a heat quantity required for preventing freezing separately, measures a road surface state about all items of drying/wetting/snow cover according to a road surface light reflection value, road surface temperature, road surface snow cover depth, and presence or absence of vehicles in a non-contact manner linearly and transversely on a road surface, specifies places where a set value is exceeded from a state of road transverse change for each of the measured items, and represents the measured items in numerical values as a distribution ratio with respect to the entire road surface.

Here, items to be measured by the sensor, set contents, and the like are as described below. A measurement frequency is set arbitrarily in a range of 5 to 15 minutes and is adopted as a unit time for measurement. In principle, a road surface state is measured for each unit time based on the hour.

[Weather Measurement Item]
(1) Snowfall intensity measurement and judgment on a snowfall phenomenon according to a snow particle counting (hereinafter referred to as snowfall intensity)
(2) Measurement of a heat quantity required for melting snowfall (hereinafter referred to as snow-melting heat quantity)
(3) Measurement of a heat quantity required for preventing freezing (hereinafter referred to as freezing heat quantity)
(4) Air temperature measurement (hereinafter referred to as air temperature)
(5) Measurement of presence or absence of rain from the sky or moisture of melted snow (hereinafter referred to as moisture sensing)

As a method of heat quantity measurement, a disc-shaped dummy road surface with a size of about $\frac{1}{30}$ m$^2$, in which an electric heater for heat quantity measurement is buried and a lower surface of which is thermally insulated such that heat of the heater is transmitted uniformly to an upper surface thereof, is adopted as a reference surface, and a melting heat quantity for snow falling on the surface and a heat quantity required for preventing freezing are converted into a heat quantity per 1 m$^2$/one minute.

[Facility Capacity Setting]

A snow-melting facility sets a heat quantity of 1 $m^2$/minute as a facility capacity value that effectively acts on a snow-melting surface based on a heat supply amount per 1 $m^2$ set in the design. For example, when a design value is 200 W/$m^2$, the heat quantity is 860 cal×0.2÷60=2866 cal. However, when it is assumed that a heat quantity effectively acting on the snow-melting surface is 90%, the facility capacity is set as 286 cal×0.9=2579 cal/$m^2$·minute.

[Facility Capacity Control Value and Heat Balance Control]

A facility capacity control value is a value for comparing a measured snow-melting/freezing heat quantity and a facility capacity set value and variably controlling the facility capacity in a range of 0 to 100% for every unit time for measurement. In order to supply a value equal to the measured snow-melting/freezing heat quantity to the snow-melting surface, a facility capacity value set in advance and a measured heat quantity value are compared, and if the facility capacity value is equal to or larger than the measured heat quantity, control operation is performed. If the facility capacity value is smaller than the measured heat quantity, control of 100% is outputted, but insufficiency of a heat quantity occurs. This insufficiency of the heat quantity is added to a snow-melting/freezing heat quantity value to be measured next to obtain a necessary heat quantity. When this necessary heat quantity and the facility capacity set value are compared, and if a heat quantity is still insufficient, the insufficiency is added to a snow-melting/freezing heat quantity to be measured next.

In this way, a heat quantity equal to a heat quantity measurement value for snowfall/freezing is continuously applied to the snow-melting surface, and if an insufficient heat quantity remains after a snowfall/freezing heat quantity is finished, the heat quantity is supplied to the road surface to stop the control. The series of operations are referred to as heat balance control.

[Facility Capacity Lower Limit Setting]

When the facility capacity control value is small in performing the heat balance control, supplied heat does not function effectively. Accordingly, a facility capacity lower limit setting is provided, and control is performed by a method of supplying heat with a lower limit value if control capacity is lower than the setting. A usual facility capacity lower limit setting value is set in a range of 20 to 50%.

[Items of Measurement of a Road Surface State with a Transverse Distribution Ratio]
(1) Irradiate reference light on a road surface to judge distribution ratios of drying/wetting/snow cover according to a measurement value of light reflection intensity of the reference light (hereinafter referred to as drying distribution, wetting distribution, and snow cover distribution, respectively)
(2) Measurement of a road surface temperature distribution (hereinafter referred to as road temperature distribution)
(3) Measurement of a road surface snow cover depth distribution (hereinafter referred to as snow cover depth distribution)
(4) Measurement of passing vehicle height as an approximate numeral (hereinafter referred to as vehicle judgment)
(5) Road surface state image (hereinafter referred to as road surface image)

As a method of distribution measurement, a circle with a diameter of about 15 cm is set as a measurement point, and a road surface is sectioned equally by an arbitrarily set number in a range of 50 to 100 points while moving the measurement point in a direction crossing the road. As a measurement of a passing vehicle height, a value of reflected reference light irradiated on the road surface and reflected in a space above the road surface is distinguished in three stages of height to judge presence or absence of a vehicle passing on the road and height of the vehicle.

Automatic Control for Snow-Melting and Freezing Prevention According to Combination of Measurement Items, Information Transmission, etc.

[Freezing Prevention Control]

If a freezing heat quantity occurs, a road temperature distribution ratio at 1° C. or less is 50% or more and a wetting distribution ratio is 50% or more, the heat balance control is performed (setting of temperature and percentage can be changed arbitrarily). when the road temperature or the wetting distribution ratio exceeds the set value during the heat balance control, the heat balance control is neglected and stopped. Even if there is no measurement value of a freezing heat quantity, if the road temperature distribution ratio at 1° C. or less is 50% or more and the wetting distribution ratio is 50% or more, a heat quantity is supplied at 100% of the facility capacity (setting of temperature and percentage can be changed arbitrarily).

[Method of Snow-Melting Control]

In a state in which the road temperature distribution ratio at 1° C. or less is 50% or more, if a snow-melting heat quantity occurs, the heat balance control is performed (setting of temperature and percentage can be changed arbitrarily). If the road temperature distribution ratio exceeds the setting during the heat balance control, the heat balance control is stopped. When the road temperature distribution ratio at 1° C. or less is 50% or more and the road surface snow cover distribution ratio is 30% or more, snow melting is started. When these ratios are lower than the setting, the control is stopped (setting of temperature and percentage can be changed arbitrarily).

[Remote Monitoring Control Function]

Values measured at every 5 to 15 minutes and road surface images are transmitted as information to the outside using RS232C and a computer network, and an operation stop signal from an information receiving side is received.

[Recording Function for a Measurement Value]

Values measured at every 5 to 10 minutes and states of judgment are stored in the sensor, and the information can be fetched arbitrarily.

DETAILED DESCRIPTION OF PREFERRED EMBODIMENT

Figure 1:
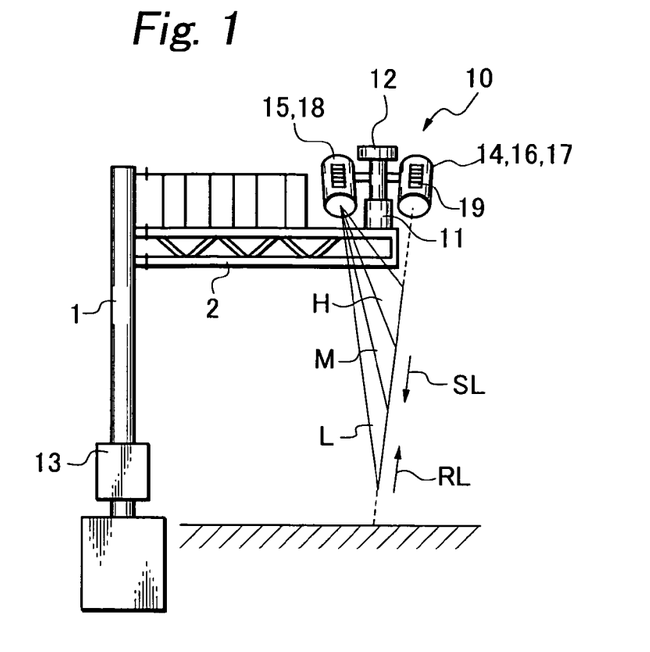
FIG. 1 is a front view showing an operation state of a road surface sensor according to an embodiment of the invention.
Figure 2:
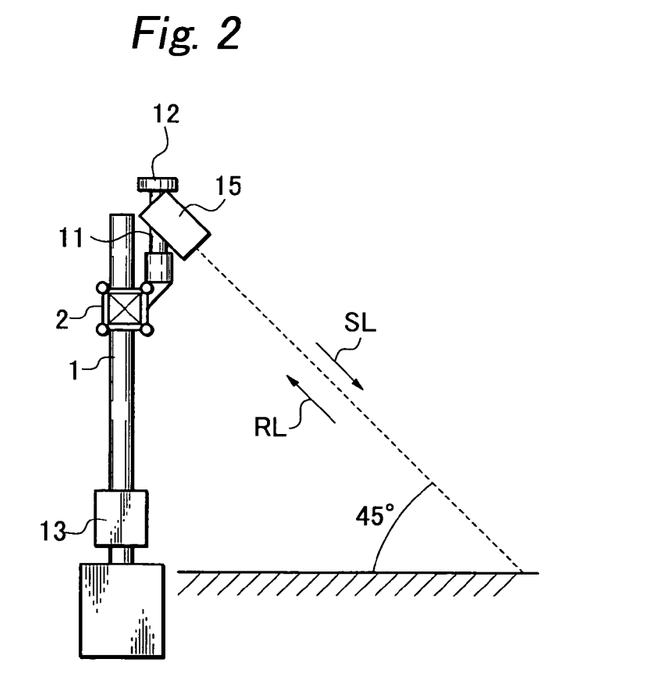
FIG. 2 is a side view of the operation state of the road surface sensor.

FIG. 1 shows an embodiment of a road surface sensor in accordance with the invention. A road surface sensor 10 is set on a tip portion of a support arm 2 that sticks out horizontally toward the center of a road from a place equal to or higher than 5.5 meters of a support pole 1 provided on a road shoulder. The road surface sensor 10 includes a rotating stand 11 attached on the support arm 2 so as to be reciprocatingly rotatable horizontally in a range of 330 degrees, a group of sensors that are attached to the rotating stand 11, and a signal converter 13 attached to a lower part of the support pole 1. The group of sensors include a snow-melting/freezing heat quantity measurement dummy road surface 12 attached to a head of the rotating stand 11, a reference light irradiating/reflected light receiving device 14, a space reflection receiving device 15, a non-contact road temperature measuring device 16, a non-contact snow cover depth measuring device 17, a road surface image pickup device 18, and a moisture sensor 19 attached to sides of the rotating stand 11 so as to be rotatable with the rotating stand.

The signal converter 13 has functions of changing measurement values such as presence or absence of moisture of rain or snow, temperature, snowfall intensity, snow-melting heat quantity, freezing heat quantity, road temperature distribution, drying distribution, wetting distribution, snow cover distribution, and vehicle judgment measured by the group of sensors to signals, performing control for snow-melting by combining respective measurement results based on the measurement values, transmitting a road surface image for confirming the information and a state of snow-melting as images, and receiving an operation stop signal from an information receiving side.

The snow-melting/freezing heat quantity measurement dummy road surface 12 fixed to the head of the rotating stand 11 rotates with the rotating stand 11. However, the snow-melting/freezing heat quantity measurement dummy road surface 12 does not always have to rotate and may be attached so as not to rotate. On the other hand, the reference light irradiating/reflected light receiving device 14, the space reflection receiving device 15, the non-contact road temperature measuring device 16, the non-contact snow cover depth measuring device 17, the road surface image pickup device 18, and the moisture sensor 19 attached to the sides of the rotating stand 11 are required to rotate in order to measure distribution states of drying, wetting, snow cover, snow cover depth, and temperature on a road surface transversely in a non-contact manner and are set at an angle of 45 degrees with respect to the road surface. However, this angle can be changed arbitrarily as required.

Figure 4:
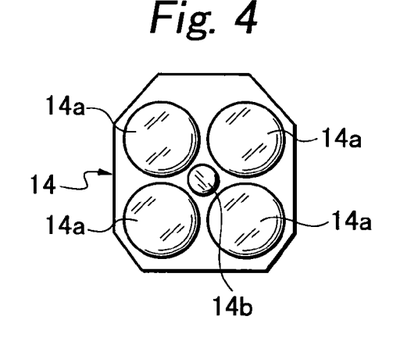
FIG. 4 is a front view showing a reference light irradiating and reflected light receiving device of the road surface sensor.
Figure 5:
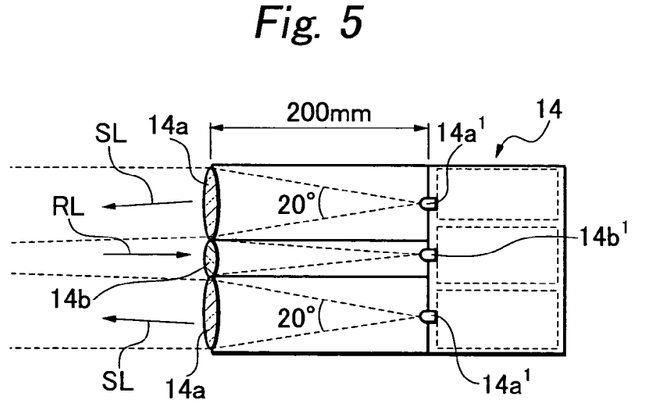
FIG. 5 is a side view showing the reference light irradiating and reflected light receiving device.
Figure 6:
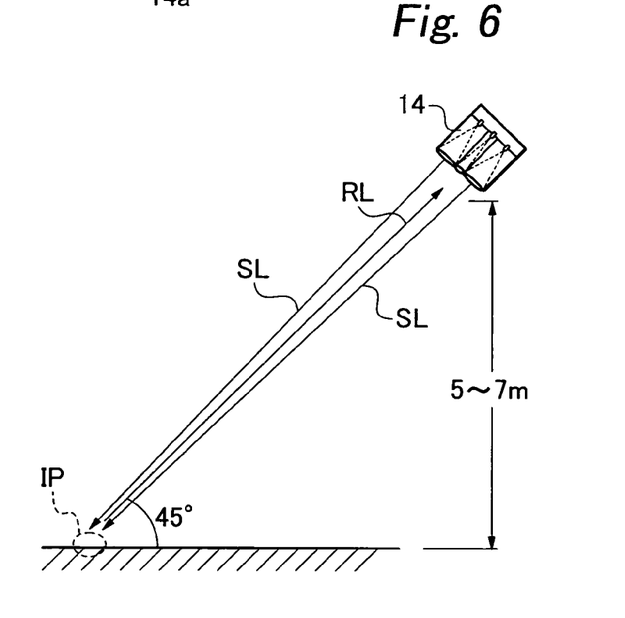
FIG. 6 is a side view showing a state of road surface reflected light measurement.

FIGS. 4 and 5 show the reference light irradiating/reflected light receiving device 14. The reference light irradiating device uses a condensing type high-intensity light-emitting diode (LED) $14a^1$ for irradiating reference light on the road surface and irradiates reference light SL, to which high-frequency modulation is applied, on a snow covered surface at a distance to the road surface of about 10 m and an irradiation angle of 45 degrees (see FIG. 6). Since sufficient reflected light RL is not acquired with a light quantity of a single LED, the reference light irradiating device uses four LEDs $14a^1$ and four condensing lenses $14a$ for irradiation of reference light. As shown in FIG. 5, although the condensing type LED (LED with a lens) emits light forward in a conical shape having an angle of 20 degrees, the light disperses at a distance of 10 m, and when the sunlight or strong artificial light is irradiated on the road surface, separation of the reflected light RL becomes impossible. Thus, a method of condensing the light of the LED with the lens $14a$ again and focusing the light of the four LEDs at one point IP on the road surface is adopted.

In general, in the case in which high light density is required, a laser beam is used, however, since the laser beam has a pinpoint irradiation area, there is a disadvantage that reflection from each pebble of a road surface paving material is caught. Thus, the light of the LEDs was condensed by the lenses and irradiated on the road surface to have a reference light irradiation point with an area of about 15 cm in diameter, and average reflected light of the entire light irradiate surface was used.

In the daytime, light irradiated on the road surface includes direct sunlight, and it is necessary to separate only the reflected light RL of the reference irradiated light SL from the light. Thus, a condensing type phototransistor with a lens sensitive to the same wavelength as a red wavelength of the reference irradiated light SL is used, and a lens $14b$ for condensing the reflected light RL to a light receiving device $14b^1$ was provided in the reflected light receiving device (See FIG. 5). When the sunlight is irradiated on the snow covered road surface, the light receiving device $14b^1$ saturates to lose a sensing ability. Thus, a diameter of the lens $14b$ was reduced to avoid the saturation, and a red optical filter $14b^2$ for removing a light component shorter than a wavelength to be sensed was further provided.

In addition, a signal amplification degree of the reflected light receiving device varied and a reflection signal became unstable at the midnight when there was no sunlight and in the daytime when there was sunlight. In order to overcome this problem, a sunlight correction LED $14b^3$ is provided in the reflected light receiving device such that a constant light quantity is always made incident on the reflected light receiving device (see FIG. 7), and a DC voltage constant control circuit DCS was provided to perform current control for the reflected light receiving device such that a constant light quantity was always made incident on the reflected light receiving device $14b^1$.

Figure 7:
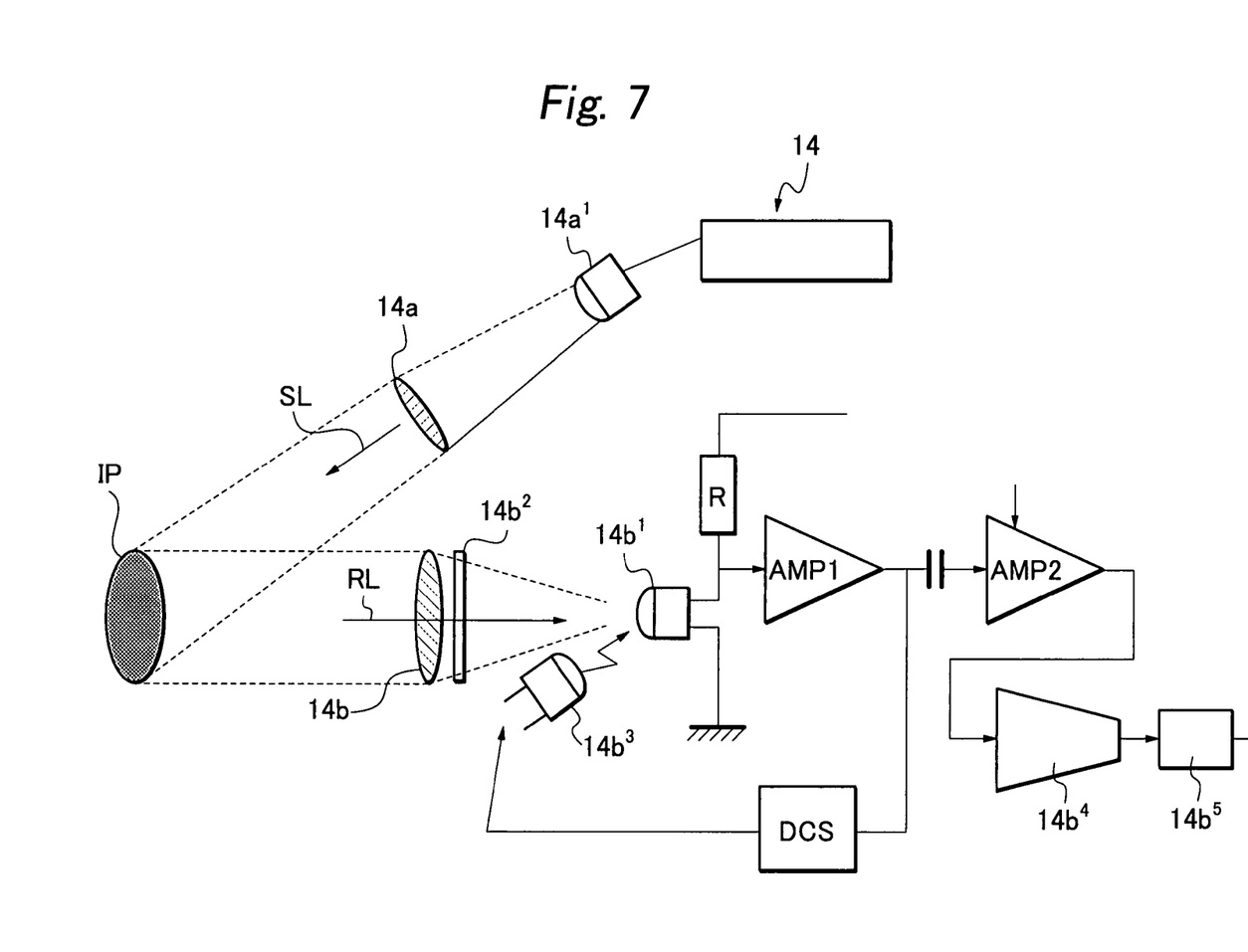
FIG. 7 is a diagram showing a flow of reference light irradiation and reflected light reception.

Moreover, a band pass filter $14b^4$ is provided for preventing influence on a reflection signal in terms of frequency due to artificial light such as a street lamp (discharge lamp), and only a reflected light signal of a reference light is extracted stably through a rectifier circuit $14b^5$ (see FIG. 7). Incidentally, pre-amplification is performed in an AMP1 in FIG. 7, and synchronous amplification is performed in an AMP2. A value of the synchronous amplification was adjusted in a range of 500 to 1000 times such that a reference light reflected signal was 0 to 10 V, and 10 V was obtained at the time of snow cover. As a result of the adjustment, a reflection value at the wet time on a measured asphalt road surface was about 0.5 V, which was in a range of 0.9 to 1.1 V at the dry time, and was in a range of 1.5 to 2.0 V on wet snow. The values were usable as basic values for judging drying/wetting/wet snow/snow cover on the road surface.

The space reflected light receiving device 15 is constituted like the reflected light receiving device 14, and dissolves an electric signal of a light receiving device, which distinguishes only a reflection quantity of a reference light from the sunlight, the street lamp, and the like, by 10 bits to change the electric signal to numerical values, judges distinction of a road surface RD and a vehicle AM, and has a count function for counting the number of vehicles passed.

The non-contact road temperature measuring device 16 is housed in a sensor case, which keeps a thermostatic state, such that the non-contact road temperature measuring device 16 can withstand the intense winter weather such as snow and freezing, to be allowed to perform measurement at stable accuracy even under the environment of 20° C. below freezing point. Like the non-contact road temperature measuring device 16, the non-contact snow cover depth measuring device 17 is housed in a sensor case to be allowed to perform measurement at stable accuracy even under the environment of 20° C. below freezing point.

The road surface image pickup device 18 uses a TV camera or a digital camera of an existing technique and is housed in a sensor case that is used like as a thermostatic bath. Image data is processed for exclusive use by the sensor such that the image data can be integrated with the respective measured data and used as information. The two moisture sensing devices 19 are arranged on an upper surface outside the sensor case and have a pattern of a print board for electric circuit formed in a shape of a comb to sense moisture of snow or rain according to a change in electric resistance.

The snow-melting/freezing heat quantity measurement dummy road surface 12 has an electric heater for heat quantity measurement buried in a disc-shaped dummy road surface with a size of about $1/30$ m$^2$ and thermally insulates a lower surface thereof such that heat of the heater is transmitted uniformly to an upper surface thereof. The snow-melting/freezing heat quantity measurement dummy road surface 12 adopts the dummy road surface as a reference surface and converts a melting heat quantity for snow falling on the surface and a heat quantity required for freezing prevention into a heat quantity per 1 m$^2$/one minute.

The group of sensors performs measurement of respective items according to a method described below.

[Measurement of Snowfall Intensity]

By using the function of a space reflection height H of the space reflected light receiving device 15 (see FIG. 1), a range of upper and lower limits is provided for a reflection value that instantly changes at the time when a snow particle passes, and a snow particle is counted as a snow particle if a reflection value is within the range of a reflection value and the snow particle is within time setting of a passing snow particle. The snow particle passing time can be set arbitrarily in a range of 0.0005 to 0.099 seconds. In the embodiment, the snow particle passing time is set to 0.0015 seconds. More specifically, a snow particle is counted in a state in which conditions of air temperature of 3° C. or less and heat quantity measurement dummy road surface temperature of 2° C. or less are satisfied.

Judgment for snowfall can be set in a range of the number of snow particles of 3 to 9 per 1 minute. If the number of snow particles exceeds a set value, it is judged as snowfall, and the counted value represents the intensity of snowfall (the number of snow particles is set to 3 in the embodiment). Since a value of space reflection due to passage of a vehicle and time duration thereof are significantly different from the value and the time duration due to a snow particle, the vehicle and the snow particle can be distinguished (the set numbers represented here can be changed arbitrarily).

Only a light reflection signal due to a snow particle sensed by the light receiving device 15 with the space reflection height H is distinguished and counted. Thus, there is an advantage that a separate sensor for sensing a snow particle is not required, and a signal reflected by a snow particle can be distinguished and obtained from a signal of the space reflection height H.

Since an area of the space reflection height H is dose to a base from which irradiated reference light spreads in a conical shape toward the road surface, the space reflection height H is in an area where light reflection by a snow particle can be sensed. In addition, a light reflection signal due to passage of a vehicle and a light reflection signal due to a snow particle can be easily separated because a form of change in reflection intensity and reflection time are different in both the signals. This separation function is exclusively developed to be incorporated in the sensor.

[Measurement of a Snow-Melting Heat Quantity]

A heat quantity which is required for keeping the surface temperature of the snow-melting/freezing heat quantity measurement dummy road surface 12 at 1.5° C. in a state in which there is moisture sensing or snowfall sensing, is assumed to be a snow-melting heat quantity (temperature setting can be changed arbitrarily).

[Measurement of a Freezing Heat Quantity]

A heat quantity, which is required to keep the surface temperature of the snow-melting/freezing heat quantity measurement dummy road surface 12 at 0.5° C. in a state in which there is no moisture sensing or snowfall sensing, is assumed to be a freezing heat quantity (temperature setting can be changed arbitrarily).

[Method of Measuring a Road Surface State with a Transverse Distribution Ratio]

Figure 3:
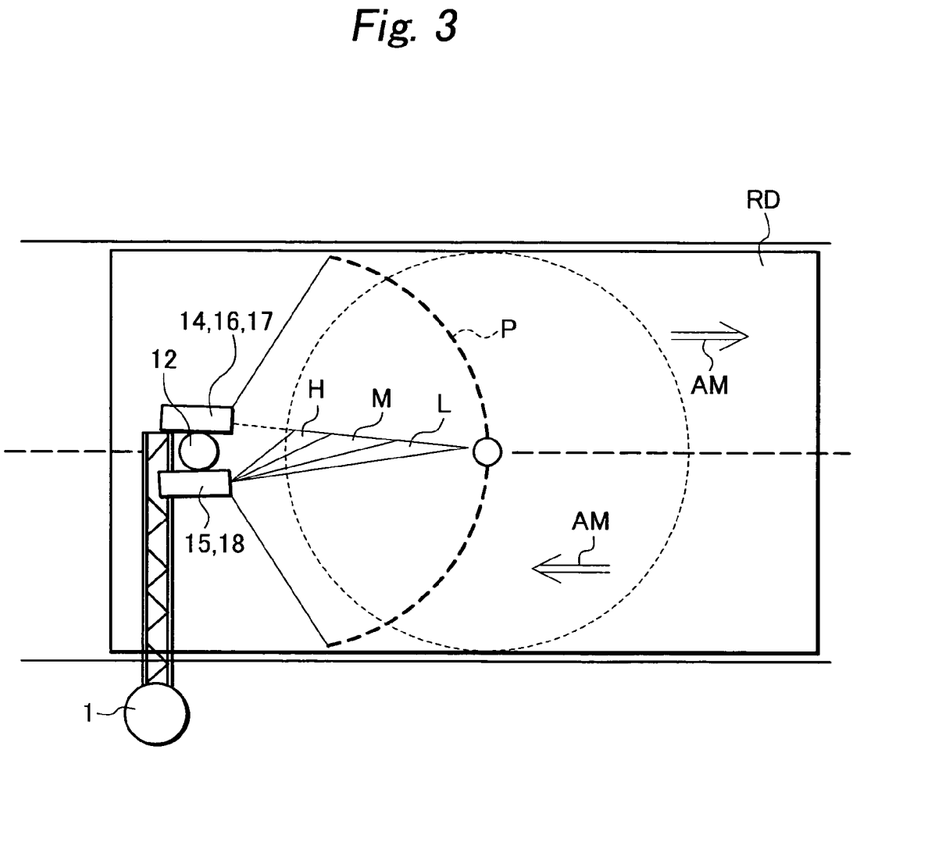
FIG. 3 is a plan view of the operation state of the road surface sensor.

As shown in FIG. 3, as the rotating stand 11 rotates, a measurement point P on the road surface RD to be measured by the reference light irradiating/reflected light receiving device 14, the space reflection receiving device 15, the non-contact road temperature measuring device 16, the non-contact snow cover depth measuring device 17, the road surface image pickup device 18, and the moisture sensor 19 moves in an arc shape transversely on the road surface, whereby measurement of a road surface state is performed. The arc line is equally divided into 100 points, and respective measurement values are dissolved by 10 bits and changed to numerical values for each divided point (the number of divisions can be set arbitrarily in a range of 50 to 100). Rotation speed of the rotating stand 11 is set to about 0.5 minutes with respect to a rotation angle of 180 degrees. As described before, the measurement is set to perform at every ten minutes in a range of 5 to 15 minutes. A position of the rotating stand 11 at the time when the rotting stand 11 stops can be set arbitrarily at a position where vehicle judgment can be sensed easily.

[Distinction of a Road Surface and a Vehicle and a Method of Counting Vehicles]

Since measurement of a road surface state cannot be performed while a vehicle AM is in the measurement road surface RD, it is necessary to distinguish the vehicle AM and the road surface RD. It is judged by the space reflected light receiving device 15 that the vehicle AM has entered the measurement road surface RD using space reflection high H, space reflection medium M, and space reflection low L shown in FIGS. 1 and 3. Height of the vehicle AM can be distinguished from a result of measurement of three kinds of space reflections, high H, medium M, and low L, and the number of vehicles passed can also be counted.

[Control of Snow-Melting/Freezing Prevention]

Since a state of a road surface is caused by a change in weather, a heat quantity that the road surface has varies from time to time due to solar irradiation in the daytime. Thus, temporal difference occurs in the start of snow cover and freezing.

Timing that snow melting starts depending on such difference in a heat quantity of a road surface is determined by measurement of a road surface state, and the heat balance control is performed for a supplied heat quantity for snow-melting based on the measured snow-melting heat quantity and freezing heat quantity. The detailed control is performed as described below.

If a road surface temperature distribution ratio at 1° C. or less is 50% or more and a heat quantity for snow melting or freezing is measured, operation for snow melting is started and a heat quantity is supplied by the heat balance control. During the heat balance control or in the case in which a snow cover distribution ratio has exceeded 20% even if there is no heat quantity measurement value, snow melting is performed with 100% of the capacity of the snow-melting facility. In addition, in the freezing prevention control, the heat balance control is performed in the case in which the road surface temperature distribution ratio at 1° C. or less is 50% or more and a wetting distribution ratio is 50% or more, and in the case in which there is not heat quantity measurement value, a snow-melting heat quantity is supplied with 100% capacity. In the case in which a vehicle stops on the road surface and a ratio of the road surface blocked by the vehicle and unable to be observed is more than 40%, control by road surface observation is stopped, and operation is performed by the heat balance control.

[Result of Energy Saving by Carrying out Snow-Melting]

When automatic operation was performed using the road surface sensor in accordance with the invention, a heating value was 175 w/m$^2$ in electric snow melting.

In order to confirm a degree of energy saving, control by the conventional sensor of the three element control whose a facility was completed about fifteen years ago, and control by the sensor according to the invention were simultaneously performed by dividing the site into two parts considering that ambient conditions of the respective snow-melting surfaces be equal. As a result, an electric heat value supplied for snow-melting/freezing prevention from Dec. 1, 2002 to the end of February, 2003 was found to be only 45% in the control by the sensor of the invention compared to the conventional three element control, and energy saving of 55% was attained.

[Remote Monitoring Control using Information]

As a result of judging a road surface state by transmitting all pieces of information measured by the road surface sensor and control information for snow-melting as well as road surface images to a control room 700 km away via the Internet, it was proved that a situation in which start and stop of snow-melting are performed appropriately and a state in which snow covers a road surface at the time of snowfall exceeding a snow-melting capacity could be dearly judged through measurement data and images, necessity for snow removal could be indicated from a distribution state of road surface snow cover depth and an instruction for spreading a freeze proofing agent could be indicated from planarity and temperature of a snow covered surface. Furthermore, even in the case in which snow was brought onto a snow-melting road surface when it was fine and hot and snow was not expected, it could be judged with the remote monitoring control function that abnormal road surface snow cover occurred to issue warning and a snow cover state could be judged dearly with road surface images, and artificial backup control from a remote location could be coped with.

As described above, the road surface sensor of the invention has a structure in which the reference light irradiating/reflected light receiving device, the space reflection receiving device, the non-contact road temperature measuring device, the non-contact snow cover depth measuring device, the road surface image pickup device, the snow-melting/freezing heat quantity dummy road surface, and the moisture sensor are integrally formed on the rotating stand, and the rotating stand is rotated reciprocatingly. Advantages as described below can be obtained.

The road surface sensor in accordance with the invention can observe a weather situation, a state of a road surface, and a flow end road surface state of sprinkled and melted snow on a real time basis. Therefore, accurate snow-melting operation management can be realized, a road surface state can be grasped accurately, and it becomes possible to perform snow removal and freezing preventive work in a timely manner. As a result, a road surface state can be measured sequentially to perform snow melting and prevent freezing without consuming energy wastefully.

Further, the weather situation, the road surface state, and the flow end road surface state observed by the sensor can be sent to a remote location, and a snow-melting device and a road surface freezing preventing device can be operated from the remote location. Compared with the case in which a weather situation and a road surface state are grasped by patrol as in the past, there is no blank time, objective judgment based on predetermined criteria is performed, and personnel expenses required for the patrol can be reduced.

What is claimed is:

1. A road surface sensor for performing automatic control for road snow-melting by measuring a snowfall and an amount of freezing as a heat quantity required for snow-melting and a heat quantity required for freezing prevention in a unit time period, measuring a state of distribution of drying, wetting, snow cover, snow cover depth, and temperature on a road surface transversely in a non-contact manner, and combining the measured heat quantities and the state of road surface, the road surface sensor comprising:

a rotating stand provided so as to be reciprocatingly rotatable upward on the road surface;

a snow-melting/freezing heat quantity measurement dummy road surface having an electric heater buried therein and to be used as a reference road surface for heat quantity measurement to derive a melting heat quantity for snow falling on the surface and a heat quantity required for freezing prevention;

a group of sensors attached to the rotating stand so as to be rotatable together, the sensors consisting of:
   a reference light irradiating/reflected light receiving device;
   a space reflected light receiving device;
   a non-contact road temperature measuring device;
   a non-contact snow cover depth measuring device;
   a road surface image pickup device; and
   a moisture sensor, wherein
   the reference light irradiating/reflected light receiving device includes a reference light irradiating device for irradiating reference light and a reflected light receiving device for receiving the reflected light of the reference light from the road surface, and the reflected light receiving device separates and receives only reflected light of the reference light out of the reflected light from the road surface.

2. A road surface sensor according to claim 1, wherein the reference light irradiating device includes four sets of irradiation sources, each set having a condensing type high-intensity light-emitting diode combined with a condensing lens to irradiate reference light on the road surface to which high-frequency modulation is applied, and the reflected light receiving device includes a condensing type phototransistor which is sensitive to same wavelength as a red wavelength of the reference irradiated light, and a lens for condensing reflected light on the light receiving device.

3. A monitoring control method for performing automatic control for road snow-melting in a remote location by measuring a snowfall and an amount of freezing as a heat quantity required for snow-melting and a heat quantity required for freezing prevention in a unit time period, measuring a state of distribution of drying, wetting, snow cover, snow cover depth, and temperature on a road surface transversely in a non-contact manner with a road surface sensor, and combining the measured heat quantities and the state of road surface, wherein the road surface sensor comprises:

- a rotating stand provided so as to be reciprocatingly rotatable upward on the road surface;
- a snow-melting/freezing heat quantity measurement dummy road surface having an electric heater buried therein and to be used as a reference road surface for heat quantity measurement to derive a melting heat quantity for snow falling on the surface and a heat quantity required for freezing prevention;
- a group of sensors attached to the rotating stand so as to be rotatable together, the sensors consisting of:
  - a reference light irradiating/reflected light receiving device including a reference light irradiating device for irradiating reference light and a reflected light receiving device for receiving the reflected light of the reference light from the road surface, and the reflected light receiving device separates and receives only reflected light of the reference light out of the reflected light from the road surface; a space reflected light receiving device; a non-contact road temperature measuring device; a non-contact snow cover depth measuring device; a road surface image pickup device; and a moisture sensor; and
- a signal converter to change values measured by the respective sensors to signals, and
- the road surface sensor performs snow-melting control by combining respective measurement results, transmits a road surface image for confirming the information on the measurement results and a snot-melting state as images, and receives an operation stop signal from an information receiving side.

* * * * *